(12) United States Patent
Leong et al.

(10) Patent No.: US 12,326,403 B2
(45) Date of Patent: Jun. 10, 2025

(54) SURFACE PLASMON RESONANCE SIGNAL AMPLIFICATION

(71) Applicant: Nicoya Lifesciences Inc., Kitchener (CA)

(72) Inventors: Chanel Leong, Ghent (BE); Hojjat Seyed Jamali, Kitchener (CA)

(73) Assignee: Nicoya Lifesciences Inc., Kitchener (CA)

( * ) Notice: Subject to any disclaimer, the term of this patent is extended or adjusted under 35 U.S.C. 154(b) by 0 days.

(21) Appl. No.: 18/463,700

(22) Filed: Sep. 8, 2023

(65) Prior Publication Data

US 2023/0417668 A1 Dec. 28, 2023

Related U.S. Application Data

(63) Continuation of application No. PCT/CA2022/050344, filed on Mar. 9, 2022.

(60) Provisional application No. 63/158,940, filed on Mar. 10, 2021.

(51) Int. Cl.
*G01N 21/01* (2006.01)
*G01N 21/552* (2014.01)
*G01M 11/02* (2006.01)

(52) U.S. Cl.
CPC ....... *G01N 21/554* (2013.01); *G01M 11/0264* (2013.01)

(58) Field of Classification Search
CPC ......... G02B 5/008; B82Y 30/00; C03C 17/40; C03C 2217/255; C03C 2217/425; G01N 21/01; G01N 21/658; G01N 2201/02; Y10T 428/12104; Y10T 428/24909

USPC .......................................... 356/445, 301, 244
See application file for complete search history.

(56) References Cited

U.S. PATENT DOCUMENTS

| | | | | |
|---|---|---|---|---|
| 8,263,377 B2* | 9/2012 | Dudek | ................... | C12Q 1/485 435/194 |
| 8,288,162 B2* | 10/2012 | Ure | ................... | G01N 33/54353 977/773 |
| 8,355,136 B2* | 1/2013 | Glazier | ................... | B82Y 15/00 356/436 |
| 8,693,003 B2 | 4/2014 | Nieva et al. | | |

(Continued)

FOREIGN PATENT DOCUMENTS

| CA | 2846909 A1 | 9/2014 |
|---|---|---|
| CA | 3108408 A1 | 2/2020 |

(Continued)

OTHER PUBLICATIONS

Bastús et al., Homogeneous conjugation of peptides onto gold nanoparticles enhances macrophage response. ACS Nano. 3(6):1335-1344 (2009).

(Continued)

*Primary Examiner* — Isiaka O Akanbi
(74) *Attorney, Agent, or Firm* — Quarles & Brady LLP (57) ABSTRACT

The present invention is directed to an improved surface plasmon resonance (SPR) and localized surface plasmon resonance (LSPR) sensors, improved SPR and LSPR sensor surface chemistry, and methods and systems for improved detection of analytes in SPR and LSPR. Use of the SPR and LSPR sensors described herein improves signal amplification, and thus, provides for higher signal-to-noise, in detection of various analytes, such as proteins, antibodies, carbohydrates, and nucleic acid molecules.

19 Claims, 3 Drawing Sheets

(56) References Cited

U.S. PATENT DOCUMENTS

| | | | | |
|---|---|---|---|---|
| 9,007,575 | B2* | 4/2015 | Chou | G01N 21/59 |
| | | | | 356/300 |
| 9,322,823 | B2 | 4/2016 | Denomme et al. | |
| 9,366,672 | B2* | 6/2016 | Zeng | G01N 33/56911 |
| 9,970,875 | B2* | 5/2018 | Matsuo | G01N 33/54373 |
| 10,794,904 | B2 | 10/2020 | Denomme et al. | |
| 11,278,890 | B2 | 3/2022 | Denomme et al. | |
| 11,598,771 | B2 | 3/2023 | Denomme et al. | |
| D983,682 | S | 4/2023 | Lubjenka et al. | |
| 2004/0248111 | A1* | 12/2004 | Metz | G01N 33/54333 |
| | | | | 435/6.16 |
| 2004/0263853 | A1 | 12/2004 | Hill et al. | |
| 2009/0141376 | A1* | 6/2009 | Smith | G02B 5/04 |
| | | | | 359/833 |
| 2010/0164489 | A1* | 7/2010 | Lukaszew | G01N 33/54373 |
| | | | | 324/244.1 |
| 2014/0271366 | A1* | 9/2014 | Denomme | G01N 21/554 |
| | | | | 422/69 |
| 2016/0299134 | A1* | 10/2016 | Denomme | G01N 21/554 |
| 2017/0113249 | A1 | 4/2017 | Viel et al. | |

FOREIGN PATENT DOCUMENTS

| | | |
|---|---|---|
| WO | WO-2020031089 A1 | 2/2020 |
| WO | WO-2020049524 A1 | 3/2020 |
| WO | WO-2020061715 A1 | 4/2020 |
| WO | WO-2020065537 A1 | 4/2020 |
| WO | WO-2020186360 A1 | 9/2020 |
| WO | WO-2021097582 A1 | 5/2021 |
| WO | WO-2021146804 A1 | 7/2021 |
| WO | WO-2021146809 A1 | 7/2021 |
| WO | WO-2021168578 A1 | 9/2021 |
| WO | WO-2021212235 A1 | 10/2021 |
| WO | WO-2022051840 A1 | 3/2022 |
| WO | WO-2022082316 A1 | 4/2022 |
| WO | WO-2022164756 A2 | 8/2022 |
| WO | WO-2022165589 A1 | 8/2022 |
| WO | WO-2022187931 A1 | 9/2022 |
| WO | WO-2022187954 A1 | 9/2022 |
| WO | WO-2022221946 A1 | 10/2022 |
| WO | WO-2022221947 A1 | 10/2022 |
| WO | WO-2022246569 A1 | 12/2022 |
| WO | WO-2023004516 A1 | 2/2023 |
| WO | WO-2023039678 A1 | 3/2023 |
| WO | WO-2023147672 A1 | 8/2023 |
| WO | WO-2023147674 A1 | 8/2023 |
| WO | WO-2023168521 A1 | 9/2023 |
| WO | WO-2023178432 A1 | 9/2023 |

OTHER PUBLICATIONS

Bergström et al., SPR sensor surfaces based on self-assembled monolayers. Linköping University (Sweden). Master's thesis 77pgs. (2009).

Choi et al., Maturation of the malarial phosphatidylserine decarboxylase is mediated by high affinity binding to anionic phospholipids. J Biol Chem. 299(5):104659, pp. 1-12 (2023).

Egorova et al., One peptide for them all: Gold nanoparticles of different sizes are stabilized by a common peptide amphiphile. ACS Nano. 14(5):5874-5886 (2020).

Fuller et al., Polyelectrolyte-coated gold nanoparticles: the effect of salt and polyelectrolyte concentration on colloidal stability. Polymers (Basel). 10(12):1336 (2018).

Futaki et al., Arginine carrier peptide bearing Ni(II) chelator to promote cellular uptake of histidine-tagged proteins. Bioconjug Chem. 15(3):475-481 (2004).

Hanson et al., Application of the Nicoya OpenSPR to Studies of Biomolecular Binding: A Review of the Literature from 2016 to 2022. Sensors (Basel). 23(10):4831, pp. 1-22 (2023).

Keefe et al., Screening nonspecific interactions of peptides without background interference. Biomaterials. 34(8):1871-1877 (2013).

Krpetic et al., A multidentate peptide for stabilization and facile bioconjugation of gold nanoparticles. Bioconjug Chem. 20(3):619-624 (2009).

Larmour et al., Functionalisation, characterization, and application of metal nanoparticles for bioanalysis. Functional Nanoparticles for Bioanalysis, Nanomedicine, and Bioelectronic Devices. 1(2):33-58 (2012).

Li et al., Multiple thiol-anchor capped DNA-gold nanoparticle conjugates. Nucleic Acids Res. 30(7):1558-1562 (2002).

Liu et al., Design and mechanisms of antifouling materials for surface plasmon resonance sensors. Acta Biomater. 40:100-118 (2016).

Lévy et al., Rational and combinatorial design of peptide capping ligands for gold nanoparticles. J Am Chem Soc. 126(32):10076-10084 (2004).

Marco et al., Overview of the main methods used to combine proteins with nanosystems: absorption, bioconjugation, and encapsulation. Int J Nanomedicine. 5:37-49 (2010).

Nicoya, OpenSPR Binding Data Reveals a Potential Mechanism for the Treatment of Depression, 6 pages (retrieved on Sep. 21, 2023), at https://nicoyalife.com/publications/openspr-binding-data-reveals-a-potential-mechanism-for-the-treatment-of-depression/.

Okada et al., New protein purification system using gold-magnetic beads and a novel peptide tag, "the methionine tag". Bioconjug Chem. 22(5):887-893 (2011).

Omura et al., Comparison of plasmonic sensing between polymer- and silica-coated gold nanorods. Anal Sci. 25(2):255-259 (2009).

PCT/CA2022/050344 International Search Report and Written Opinion dated Jun. 15, 2022.

Sheard et al., Peptide multimerization as leads for therapeutic development. Biologics. 2(1):15-44 (2022).

Topor et al., Strategies for Surface Design in Surface Plasmon Resonance (SPR) Sensing. Biosensors (Basel). 13(4):465, pp. 1-23 (2023).

Vaisocherová et al., Ultralow fouling and functionalizable surface chemistry based on a zwitterionic polymer enabling sensitive and specific protein detection in undiluted blood plasma. Anal Chem. 80(20):7894-7901 (2008).

Woodruff et al., Dysregulated naive B cells and de novo autoreactivity in severe COVID-19. Nature. 611(7934):139-147 (2022).

Yadav et al., Development of peptide and protein nanotherapeutics by nanoencapsulation and nanobioconjugation. Peptides. 32(1):173-187 (2011).

Zhang et al., Colorimetric detection based on localised surface plasmon resonance of gold nanoparticles: Merits, inherent shortcomings and future prospects. Talanta. 152:410-422 (2016).

Zhao et al., State of the art in gold nanoparticle synthesis. Coord Chem Rev. 257(3-4):638-665 (2013).

Gori et al., Multiple epotope presentation and surface density control enabled by chemoselective immobilization lead to enhanced performance in IgE-binding fingerprinting on peptide microarrays, Analytica Chimica ACTA, 2017, 983:189-197.

Islam et al., Use of a Branched Linker for Enhanced Biosensing Properties in IgG Detection from Mixed Chinese Hamster Ovary Cell Cultures, Bioconjugate Chemistry, 2019, 30(3):815-825.

Leblanc, Immobilization of gold nanoparticles for colourimetric detection of biofilms on surfaces, 2015, retrieved from https://uwspace.uwaterloo.ca/items/d6781bb1-645a-45b0-9898-5f4dcf3f19a7, 108 pages.

European Patent Office, Extended European Search Report, Application No. 22766035.4, Dec. 17, 2024, 7 pages.

* cited by examiner

Exemplary SPR or LSPR tunable linkers 300

Fig. 3

SURFACE PLASMON RESONANCE SIGNAL AMPLIFICATION

1. CROSS REFERENCE TO RELATED APPLICATIONS

This patent application is a continuation application of International Application No. PCT/CA2022/050344, filed on Mar. 9, 2022, which claims the benefit of U.S. Prov. Ser. No. 63/158,940, filed on Mar. 10, 2021, each of which is herein incorporated by reference in its entirety.

2. FIELD OF THE INVENTION

This invention relates to techniques for improving Surface Plasmon Resonance spectroscopic signals.

3. BACKGROUND OF THE INVENTION

Surface plasmon resonance (SPR) and localized surface plasmon resonance (LSPR) spectroscopy are used for a variety of analytical methods such as quantitative, kinetic and thermodynamic studies. SPR and LSPR provide a label-free method of determining molecular binding events in real-time for analytes such as DNA, proteins and polymers. Current SPR and LSPR applications use a self-assembled monolayer (SAM) composed of a thiol containing group attached to a surface material (e.g., a silver or gold metal, such as a thin gold film or a gold nanoparticle), with an alkane chain extending away from the surface material and a single functional group (e.g., a carboxylic acid group) at the end of the alkane chain. The alkane chain is very hydrophobic and results in non-specific binding signal noise. Non-specific binding signal noise is a limitation of SPR and LSPR and is caused by undesired molecules or compounds binding with the sensor surface. For example, SPR and LSPR users currently try elaborate methods to minimize and/or correct for non-specifically bound material. Furthermore, SPR and LSPR methods are sensitive to the molecular weight of the analyte. These techniques have a higher sensitivity to high molecular weight molecules but steric hindrances can limit successful binding. Conversely, with low molecular weight molecules the sensitivity is quite low and therefore the signal is typically too low to be discernible above the non-specific binding noise. There is a need in SPR and LSPR for improved methods for amplifying the signal while also reducing the noise.

4. SUMMARY OF THE INVENTION

The present invention is directed to an improved SPR and LSPR sensor, improved SPR and LSPR sensor surface chemistry, and methods and systems for improved detection of analytes in SPR and LSPR. Use of the SPR and LSPR sensors described herein improves signal amplification, and thus, provides for higher signal-to-noise, in detection of various analytes, such as proteins, antibodies, carbohydrates, and nucleic acid molecules. The invention provides for the use of novel SPR and LSPR linker molecules capable of being customized to capture an analyte of interest at higher specificity than previously possible. Use of the linkers described herein increases the SPR and LSPR signals over the current state of the art methods. In accordance with the present invention, the improved SPR and LSPR sensors may include a linker attached to a surface, wherein the surface includes a solid support and a metal containing layer attached to the solid support, and wherein the linker may be attached to the metal containing layer. In one embodiment, the solid support may be functionalized with a polyelectrolyte. In one embodiment, the linker may include a self-assembled monolayer of peptides. In one embodiment, the surface may include a polyelectrolyte functionalized glass solid support coated with a gold film. In another embodiment, the surface may include a polyelectrolyte functionalized glass solid support coated with a layer of gold nanoparticles. In another embodiment, the SPR or LSPR sensor may include a glass solid support coated with a gold film or gold nanoparticles, which themselves may optionally be coated with a chemical layer including a self-assembled monolayer of peptides.

In one embodiment the linker may include an anchor site or linker "head," wherein the anchor site may be attached to the metal layer. In one embodiment the anchor site or linker "head" may include a sulfur containing chemical functional group which binds readily to the surface (e.g. a gold coated surface). In another embodiment, the anchor site or linker "head" may be composed of one or more thiol (—SH) chemical groups. In another embodiment, the anchor site or linker "head" may be composed of one to three thiol chemical groups. In another embodiment, the linker anchor site may be composed of at least one sulfur-containing amino acid (e.g., cysteine or methionine). In another embodiment, the linker may have more than one anchor site or linker "head" to attach to the metal layer.

In another embodiment, the linker may include one or more spacer molecules. In one embodiment, the one or more spacer molecules may include amino acids. In one embodiment, the one or more amino acids may include one or more amino acids comprising a carboxylic acid functional group, such as glutamic acid or aspartic acid. In another embodiment, the one or more spacer molecules may include one or more polyalkylene glycol (PAG) molecules, such as polyethylene glycol (PEG), polyoxyethylene (POE), polypropylene glycol (PPG), polybutylene glycol (PBG), amine-PEG-carboxyl (NPC) and combinations thereof. The linker may be customized or "tuned" to have the optimum length, the optimum steric considerations and/or the optimum density of attachment sites or functional groups (e.g., carboxylic acid groups) based on the customer's needs.

In one aspect the present invention is direct to a surface plasmon resonance (SPR) or localized surface plasmon resonance (LSPR), the sensor comprising: (a) a surface, wherein the surface comprises a solid support coated with a metal layer; and (b) a linker, wherein the linker comprises an anchor site, one or more spacer groups, and one or more ligand attachment sites; (c) wherein the anchor site is attached to the metal layer; and (d) wherein the one or more ligand attachment sites are capable of binding to one or more ligands. In some embodiments, the solid support comprises silica, glass or quartz.

In some embodiments, the metal layer is a metal film. In one embodiment, the metal layer is selected from a one or more of gold, silver, platinum, copper, gold coated silver, silver coated gold, a metal-coated nonmetal, metal coated non-metal nanoparticles, a combination of metals or mixtures thereof. In one embodiment, the metal layer is less than 1 nm, less than 2 nm, less than 10 nm, less than 100 nm, less than 500 nm, less than 1000 nm, or greater than 1000 nm thick. In another embodiment, the metal layer is about 100 nm. In still another embodiment, the metal layer and the polyelectrolyte together are about 100 nm.

In some embodiments, the metal layer is attached to a functionalized support. For example, in some embodiments, the solid support is functionalized with a polyelectrolyte, and optionally wherein the polyelectrolyte comprises a poly(allylamine hydrochloride), a quaternary ammonium salt, an iminium salt or mixtures thereof.

In some embodiments, the metal layer comprises a metal nanoparticle. In one embodiment, the metal nanoparticles comprise gold nanoparticles. In some embodiments, the metal nanoparticles are capped with a citrate salt, or the metal nanoparticles comprise citrate salt capped negatively charged gold nanoparticles. In one embodiment, the metal nanoparticle is less than 1 nm, less than 2 nm, less than 10 nm, less than 100 nm, less than 500 nm, less than 1000 nm, or greater than 1000 nm thick.

In some embodiments, the linker comprises a self-assembled monolayer (SAM). In one embodiment, the self-assembled monolayer comprises one or more moieties chosen to increase or decrease SAM packing, wherein the one or more moieties comprises tyrosine or phenylalanine or tryptophan or a hydrophobic spacer or combinations thereof.

In some embodiments, the anchor site comprises one or more moieties capable of binding the linker to the metal layer. In some embodiment, the one or more moieties comprises a sulfur moiety, a carbon moiety, a nitrogen moiety, a group 16 (6A) chalcogen moiety, a thiol moiety, a sulfide moiety, a disulfide moiety, a diazonium salt moiety, an amine moiety, an amino acid moiety, a diazonium salt moiety, or any combination thereof. In one embodiment, the anchor site comprises an amine moiety and wherein the amine moiety comprises a primary, secondary, tertiary or quaternary amine. In another embodiment, the anchor site comprises a sulfur moiety and wherein the sulfur moiety comprises a thioacid moiety, a thioacid anion moiety, a carbothioic acid moiety, a carbothioic acid anion moiety, a thiocarboxylic acid moiety, a thiocarboxylic anion moiety or any combination thereof. In still another embodiment, the anchor site comprises a disulfide moiety and wherein the disulfide moiety comprises a dithiocarbamate moiety or a dithiocarbamic acid moiety or any combination thereof. In yet another embodiment, the anchor site comprises a chalcogen moiety and wherein the chalcogen moiety comprises Te or Se or a combination thereof.

In some embodiments, the anchor site comprises one or more amino acids. In one embodiment, the one or more amino acids comprises from 1 to 3 amino acids. In another embodiment, the one or more amino acids comprises one or more cysteines and/or one or more methionines.

In some embodiments, the one or more spacer groups comprise one or more amino acids. In one embodiment, the one or amino acids comprise natural or synthetic amino acids. In another embodiment, the one or amino acids comprise one or more of the following glycine, tyrosine, phenylalanine, tryptophan, methionine, lysine, glutamic acid, aspartic acid, hydrophobic spacers, derivatives and/or salts of any of the foregoing, or combinations thereof. In some embodiments, the one or more amino acids comprises from 1 to about 20 amino acids, from 1 to about 10 amino acids, or from 1 to about 3 amino acids.

In some embodiments, the one or more spacer groups comprise one or more polyalkylene glycols (PAGs). In one embodiment, the one or more spacer groups comprise a branched polyalkylene glycol (PAG). In some embodiments, each of the one or more polyalkylene glycols (PAGs) comprises from about 2 to about 20 monomers, from about 2 to about 10 monomers, or from about 4 to about 8 monomers.

In some embodiments, the one or more spacer groups comprises one or more polyalkylene glycols (PAGs) and one or more amino acids. In some embodiments, the one or more spacer groups are selected to increase or decrease the length of the linker. In some embodiments, the one or more polyalkylene glycols (PAGs) comprises one or more polyethylene glycols (PEGs), polyoxyethylenes (POEs), polypropylene glycols (PPGs), polybutylene glycols (PBGs), amine-PEG-carboxyls (NPCs), or any combination thereof. In some embodiments, the one or more spacer groups in the linker are arranged in a linear chain or in a branched chain.

In some embodiments, the one or more ligand attachment sites comprise one or more chemical functional groups capable of binding to a ligand. In some embodiments, the one or more ligand attachment sites comprises one or more carboxyl groups, one or more amine groups, one or more amino acids, one or more aspartic acids, one or more glutamic acids, one or more lysine molecules or any combination thereof. In other embodiments, the one or more ligand attachment sites comprises one or more of carboxyl groups, gold, streptavidin, biotin, nitrilotriacetic acid (NTA), Protein A, dodecyl groups, glutathione molecules, lipophilic, or hydrophobic molecules, or any combination thereof.

In one embodiment, the linker comprises: (a) X anchor sites, wherein X is 1 or more; (b) Y spacer groups, wherein Y is 1 or more; and (c) Z ligand attachment sites, wherein Z is 3 or more. In another embodiment, the linker comprises: (a) X anchor sites, wherein X is at least 2; (b) Y spacer groups, wherein Y is at least 2; and (c) Z ligand attachment sites, wherein Z is at least 2. In still another embodiment, the linker comprises: (a) X anchor sites, wherein X is at least 2; (b) Y spacer groups, wherein Y is at least 2; and (c) Z ligand attachment sites, wherein Z is at least 5. In yet another embodiment, the linker comprises: (a) X anchor sites, wherein X is at least 2; (b) Y spacer groups, wherein Y is at least 5; and (c) Z ligand attachment sites, wherein is at least 10.

In some embodiments, one or more ligands are coupled to the one or more linker attachment sites, wherein the one or more ligands are capable of detecting an analyte of interest by binding to the analyte.

In another aspect, the present invention is directed to a method for detection of an analyte in a fluid using a surface plasmon resonance (SPR or LSPR) sensor, comprising: (a) providing an SPR or LSPR sensor comprising a surface, the surface comprising a solid support coated with a metal layer and a linker, wherein the linker comprises an anchor site, one or more spacer groups, and one or more ligand attachment sites; (b) contacting a fluid comprising an analyte with the SPR or LSPR sensor; and (c) measuring an optical signal to detect a change in the optical signal in response to the contacting to measure the analyte in the fluid. As one of skill in the art would readily appreciate, any of the SPR or LSPR sensor embodiments described herein can be used in accordance with this aspect of the invention.

In another aspect, the present invention is directed to a surface plasmon resonance (PR) system comprising: (a) a PR light source; (b) b. a detector; and (c) a SPR or LSPR sensor for detection of a target analyte, the SPR or LSPR sensor comprising a surface, wherein the surface comprises a solid support coated with a metal layer and a linker, wherein the linker comprises an anchor site, one or more spacer groups, and one or more ligand attachment sites. As one of skill in the art would readily appreciate, any of the SPR or LSPR sensor embodiments described herein can be used in accordance with this aspect of the invention

5 BRIEF DESCRIPTION OF DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

6. DEFINITIONS

6.1. Abbreviations and Acronyms

"AAA" is the acronym for "attachment Amino Acid."
"AG" is the acronym for ligand "attachment group."
"Asp" is the abbreviation for "Aspartic Acid."
"AuNPs" is the abbreviation for "gold nanoparticles."
"Cys" is the abbreviation for "Cysteine."
"Da" is an abbreviation for "diazonium salts."
"DMF" is the abbreviation for "Dimethylformamide."
"DMSO" is the abbreviation for "Dimethyl sulfoxide."
"fmoc" is the abbreviation for "9-Fluorenylmethyloxy-carbonyl chloride."
"fnnoc-Glu-OH" is the abbreviation for "fmoc-L-glutamic acid."
"Glu" is the abbreviation for "Glutamic Acid."
"Gly" is the abbreviation for "Glycine."
"HAA" is the acronym for linker "head amino acid."
"HATU" is the abbreviation for "(1-[Bis(dimethylamino)methylene]-1H-1,2,3-triazolo[4,5-b]pyridinium 3-oxide hexafluorophosphate, or Hexafluorophosphate Azabenzotriazole Tetramethyl Uronium)."
"HG" is the abbreviation for "head group."
"HOBT" is the abbreviation for "Hydroxybenzotriazole."
"LSPR" is the acronym for "localized surface plasmon resonance."
"Met" is the abbreviation for "Methionine."
"NPs" is the abbreviation for "nanoparticles."
"NPC" is the abbreviation for "NH$_2$-PEG-COOH" or "amine-PEG-carboxyl."
"NR" is an abbreviation for "nitrogen containing functional group."
"PAG" is an abbreviation for "polyalkylene glycol."
"PAH" is the abbreviation for the "polyelectrolyte poly (allylamine hydrochloride)."
"PE" is the abbreviation for "polyelectrolyte."
"PBG" is the abbreviation for "Polybutylene glycol."
"PBS" is the acronym for "phosphate-buffered saline."
"PEG" is the abbreviation for "Polyethylene Glycol."
"Phe" is the abbreviation for "Phenylalanine."
"POE" is the abbreviation for "Polyoxyethylene."
"PPG" is the abbreviation for "Polypropylene glycol."
"RA" is the acronym for "reagent alcohol."
"SAA" is the acronym for "spacer amino acid."
"SAM" is the acronym for "self-assembled monolayer."
"SG" is the acronym for "spacer group."
"SPR" is the acronym for "surface plasmon resonance."
"SR" is the abbreviation for "sulfur containing functional group."
"Trp" is the abbreviation for "Tryptophan."

6.2. General Definitions

"Analyte" means the chemical of interest which binds to the ligand and this binding is detected by SPR or LSPR.

"Anchoring site" means the location on the chemical (e.g. peptide) chain which is capable of attaching or is attached to the (e.g. gold) surface.

"Attachment amino acid" means any natural or custom synthesized amino acid with one or more functional groups which act as an attachment site in the linker.

"Attachment group" means any natural or custom synthesized molecule with one or more functional groups which act as a ligand attachment site in the linker.

"Attachment sites" means the locations on the (e.g. peptide) chain (e.g. carboxylic acid) which is capable of binding or coupling to the ligand.

"Diazonium salts" are chemical moieties of the form R—N$_2^+$.

"Head" means the anchor site (e.g. thiol) of the linker (e.g. peptide chain) which provides a tunable means of anchoring the SAM linker to the sensor surface.

"Head amino acid" means any natural or custom synthesized amino acid used as the anchor site in the head of the linker.

"Head group" means the molecule that acts as an anchor site (e.g. thiol) of the linker chain which provides a tunable means of anchoring the SAM Linker to the Sensor surface.

"Ligand" means the chemical moiety which may be coupled to the attachment site and which is used to bind to the analyte. The ligand, may for example, be any binder, such as an antibody, aptamer, polymer, DNA or other capture molecule having affinity for an analyte.

"Linker" means the customizable or tunable (e.g. peptide) chain which may form a self-assembled monolayer (SAM). The linker may be tunable in length, tunable in steric considerations and tunable in the density of attachment sites.

"Metal layer" means the thin metal (e.g. gold) coating or metal (e.g. gold) nanoparticle layer on the SPR or LSPR sensor surface.

"Nanoparticle" means a particle of varying sizes and shapes which can range between about 1 nm and 1000 nm with a variety of area to volume ratios.

"NH$_2$-PEG-COOH" means a heterobifunctionalized PEG polymer with an amine on one end and a carboxylic acid functional group on the other end.

"Nitrogen containing functional group" means any primary, secondary, tertiary or quaternary amine.

"Peptide Spacer" means a sequence of amino acids (e.g. Glycine) which will be used as the spacer between active amino acids having extra carboxylic acid functions. The number of repeating units in the structure of peptide spacers vary based on required spaces between active amino acids. The type of building blocks in the structure of peptide spacers may be different based on the desired hydrophilicity. Peptide spacers could be made by repeating the same unit (e.g. several Glycine units) or by combination of different building blocks.

"Polyalkylene glycol" or "PAG" means a substituted or unsubstituted linear or branched carbon chain incorporating one or more alkylene glycol moieties (i.e., oxyalkylene moieties), and optionally incorporating one or more additional moieties selected from the group consisting of —S—, —O—, —N—, and —C(O)—. Examples include polyethylene glycol (PEG), polyoxyethylene (POE), polypropylene glycol (PPG), polybutylene glycol (PBG), amine-PEG-carboxyl (NPC) and combinations thereof (e.g., linear or branched polymers including combinations of two or more different PAG subunits, such as two or more different PAG units selected from PEG, POE, PPG, PPG, PBG and NPC subunits).

"Sensor" means the combination of the "sensor surface" and the "sensor linker" used for SPR and LSPR spectroscopy.

"Solid support" means the silica containing (e.g. glass) layer on which the SPR and LSPR sensors are held.

"Sensor surface" means the combination of the sensor solid support, optional polyelectrolyte functionalization layer and metal layer.

"Spacer" means a chemical located in the linker used to lengthen or shorten the chemical (e.g. peptide) chain.

"Spacer amino acid" means any natural or custom synthesized amino acid used as a spacer in the linker.

"Spacer group" means any natural or synthesized molecule which acts as a spacer in the linker.

"Sulfur containing functional group" means any sulfur containing molecule.

7. DETAILED DESCRIPTION OF THE INVENTION

The present invention is directed to an improved SPR and LSPR sensor, improved SPR and LSPR sensor surface chemistry, and methods and systems for improved detection of analytes in SPR and LSPR. The method makes use of a novel linker molecule in the SPR/LSPR sensor including attachment sites which are capable of coupling to a ligand designed to capture an analyte of interest with higher specificity, and thus, at higher concentrations than currently possible with prior art methods. This approach increases the SPR and LSPR signal over current state of the art methods. This approach decreases the SPR and LSPR instrument noise over current state of the art methods. This approach increases the signal to noise ratio over current state of the art methods.

7.1. SPR/LSPR Sensor

Figure 1:
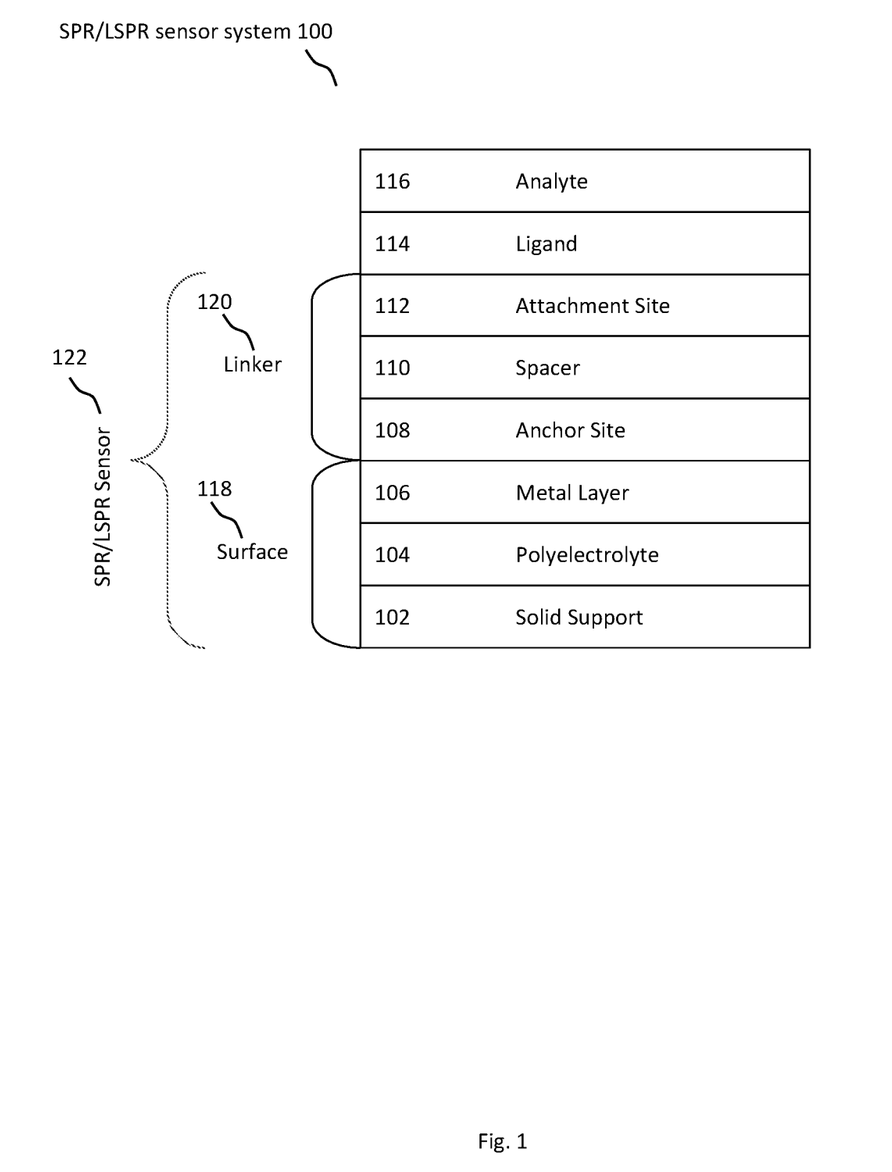
FIG. 1 illustrates an exemplary SPR or LSPR sensor system according to principles described herein.

In one embodiment, as shown in FIG. 1, the SPR/LSPR sensor assembly (100) consists of an SPR or LSPR sensor (122) which may include a sensor surface (118) and a self-assembled monolayer (SAM) of a chemical linker (120) which may bind with a ligand (114) capable of capturing analyte molecules (116). In this embodiment, the SPR or LSPR sensor (122) consists of a silica containing solid support (102) functionalized with a polyelectrolyte (104). In one embodiment, the polyelectrolyte (104) changes the surface charge of the silica containing solid support (102) which allows binding of various metals of the same charge as the silica containing solid support (102). In one embodiment, the functionalized silica solid support (102+104) of the SPR or LSPR sensor (122) may be coated with a thin metal layer (106), such as a thin film or adsorbed metal nanoparticles. The thin metal layer (106) together with the polyelectrolyte functionalized silica containing solid support (102+104) creates the SPR or LSPR surface (118). In another embodiment, the thin metal layer (106) may be coated with a chemical layer including a self-assembled monolayer (SAM) of linkers (120).

In one embodiment, the SPR or LSPR sensor surface (118) may be a transparent glass solid support (102), for example, functionalized with a polyelectrolyte (104) and coated with an SPR or LSPR metal layer (106), for example a metal thin film or metal nanoparticles. In one embodiment the transparent glass solid support (102) may be functionalized with a polyelectrolyte (104) to allow the metal layer (106) to electrostatically attach to the sensor solid support. In another embodiment the polyelectrolyte (104) may be poly(allylamine hydrochloride) (PAH) for example. PAH useful in the practice of the present invention may be purchased from Sigma-Aldrich (MilliporeSigma, St. Louis, MO, USA). In another embodiment, the metal layer (106) may, for example, be a gold film. In another embodiment, the metal layer (106) may, for example, be gold nanoparticles. The gold layer (106) may be chemically modified with a linker (120) to enable immobilization of one or more of the binding partners such as one or more ligands (114). Exemplary components of the novel linker (120) of the present invention are discussed below. In some embodiments, the dimensions of the metal layer (106) may range from about 1 nm to about 1000 nm thick with a variety of surface area to volume ratios. Gold coated transparent glass slides useful for the practice of the present invention may be purchased from GE Healthcare (Uppsala, Sweden). Gold nanoparticles useful for the practice of the present invention may be purchased commercially from Sigma-Aldrich (MilliporeSigma, St. Louis, MO) or NanoComposix (San Diego, CA, USA).

Compositions of metal films and nanoparticles that can be used for SPR and LSPR include gold, silver, platinum, copper, gold coated silver, silver coated gold, combinations of these metals, and combinations of metal-coated nonmetal nanoparticles, and others. The shape of the nanoparticles used can also vary. Useful nanoparticle shapes include but are not limited to, rods, stars, urchins, decahedra, hexagons, triangles, shells, prisms, platelets, spheres, rice, plates, cubes, cages, and bipyramids.

7.2. Linker-Ligand Structure

The linkers of the invention typically include an anchor site or "head" (108) at a first end of the linker for coupling to the SPR or LSPR surface (118), one or more spacer groups (110) and one or more ligand attachment sites (112) at a second, or distal, end of the linker for attaching one or more ligands (114). In one embodiment, the one or more spacer groups may include one or more amino acids and/or one or more PAG groups and/or one or more NTA molecules, one or more lipophilic molecules, one or more hydrophobic molecules arranged in any order and with the possibility of repeating units of each individually and as a group. Although it will be appreciated that a wide variety of variations and alternative embodiments could be conceived or constructed by those skilled in the art based on the teachings of the present invention, the linker-ligand structure may be simply illustrated as follows:

Metal layer (106)-anchor site (108)-spacer (110)-attachment site (112)-ligand (114)

In operation, the ligand may couple to an analyte:

Metal layer (106)-anchor site (108)-spacer (110)-attachment site (112)-ligand (114)-analyte (116)

The resulting linker-ligand structure may be used for detection of analytes in SPR and LSPR spectroscopy.

7.2.1. Linker Anchor Site

In one embodiment, as shown in FIG. 1, the linker anchor site or "head" (108) may include any chemical functional group which binds to the metal layer (106). In another embodiment, the linker anchor site or "head" (108) may include a sulfur containing chemical group. In another embodiment, the linker anchor site or "head" (108) may include a thiol (—SH) chemical group. In another embodiment, the linker anchor site or "head" (108) may include a sulfide (R—S—R') chemical group. In another embodiment, the linker anchor site or "head" (108) may include a disulfide (—S—SH) chemical group. In another embodiment, the linker anchor site or "head" (108) may include any functional group with more than two sulfurs. In another embodiment, the linker anchor site or "head" (108) may include any group VI chalcogen.

In another embodiment, the linker anchor site or "head" (108) may include at least one amino acid. In another embodiment, the linker anchor site or "head" (108) may include at least one cysteine amino acid group, which includes a thiol group. In one embodiment, the number of cysteines is 2 or more. In another embodiment, the number is cysteines is three. In another embodiment, the linker anchor site or "head" (108) may include at least one methionine amino acid group, which includes a sulfide group. As one of skill in the art would readily appreciate, binding may occur spontaneously between a gold film (106) and thiol functional groups or between a gold film (106) and sulfide functional groups or between gold nanoparticles (106) and thiol functional groups or between gold nanoparticles (106) and sulfide functional groups.

In another embodiment, the linker anchor site or "head" (108) may include a carbon containing chemical group. In another embodiment, the linker anchor site or "head" (108) may include a diazonium salt. As one of skill in the art would readily appreciate, binding may occur spontaneously between a gold film (106) and diazonium functional groups or between gold nanoparticles (106) and diazonium functional groups.

In another embodiment, the linker anchor site or "head" (108) may include a nitrogen containing chemical group. In another embodiment, the linker anchor site or "head" (108) may include an amine group. In another embodiment, the linker anchor site or "head" (108) may include a primary, secondary, tertiary or quaternary amine group. As one of skill in the art would readily appreciate, binding may occur spontaneously between a gold film (106) and amine functional groups or between gold nanoparticles (106) and amine functional groups.

In another embodiment, the linker anchor site or "head" (108) may include any chemical functional group which binds readily to any metal (e.g gold) containing layer (106).

7.2.2. Linker Spacer

In accordance with the present invention, the linker spacer (110) may include one or more amino acids and/or one or more PAG groups, and/or one or more NTA molecules, and/or one or more lipophilic molecules, and/or one or more hydrophobic molecules or mixtures thereof arranged in any order and with the possibility of repeating units of each individually and as a group. The linker spacer (110) may include a linear or branched molecular chain. The characteristics of the linker spacer (110) may be adjusted for length, steric considerations, and density of attachment sites (112) for the ligand (114). Although it will be appreciated that a wide variety of variations could be conceived or constructed by those skilled in the art, the linker spacer (110) may be configured in a linear (e.g. "straight chain") fashion. Additionally the linker spacer (110) may be configured with one or more branched chains in the chemical structure.

In one embodiment, a spacer group may be any molecule whose purpose is to increase or decrease the length of the linker (120). In one embodiment, the spacer group may be any molecule chosen based on its length. For example, the spacer group may be a polymer. In this embodiment, the number of repeating monomer units may be selected to increase or decrease the length of the spacer. In another embodiment, the spacer group may be a monomer unit of a polymer. Although it will be appreciated that a wide variety of variations could be conceived or constructed by those skilled in the art, the spacer group may be any variety of polyalkylene glycol (PAG) or any functionalized variety of PAG such as $NH_2$-PEG-COOH (NPC), PEG, POE, PPG, PBG and combinations thereof.

PAG compounds such as PEG, POE, PPG, PBG, and NPC are commercially available from a variety of sources, such as Sigma-Aldrich (MilliporeSigma, St. Louis, MO) and BroadPHARM (San Diego, CA). Monodisperse PEG is preferred in one embodiment. In another embodiment, the spacer group may be "$NH_2$-PEG-COOH" (NPC), commercially available from Sigma-Aldrich (MilliporeSigma, St. Louis, MO) and Advanced Biochemicals (Lawrenceville, GA). Monodisperse NPC is preferred in one embodiment.

In one embodiment, the spacer group may further include one or more amino acids, wherein the one or more amino acids may be any natural or synthetic amino acid. In this embodiment, the amino acid spacer group is a "spacer amino acid" (SAA). The number of SAAs connected together may be selected to increase or decrease the length of the spacer group. In one embodiment, the SAAs may be the same amino acid or a combination of any natural or synthetic amino acid. In another embodiment, the number of SAAs varies from 1 to 50 or from 1 to 40 or from 1 to 30 or from 1 to 20 or from 1 to 10 or from 1 to 5. In one embodiment, the number of SAAs is 1.

In one embodiment the SAA may be composed of Glycine. In another embodiment, the SAA may be composed of Phenylalanine. In another embodiment, the SAA may be any amino acid or a sequence of two or more amino acids which are used to increase or decrease the length of the linker (120). In one embodiment, the spacer group may be composed of repeating units of any one of the foregoing molecules. In one embodiment, the spacer group may be composed of repeating units of any group of the foregoing molecules arranged in any order. In another embodiment, the spacer group or SAA may be composed of a wide variety of combinations of molecules, polymers, monomers, amino acids or other chemicals whether naturally occurring, commercially available or synthesized in the laboratory.

The amino acids used in the linker in the present invention may be purchased from suppliers or manufactured manually via solid-phase peptide synthesis (SPPS) described below or using a peptide synthesis machine. Examples of suitable machines include CSBio II from CSBio (Menlo Park, California) or Biotage® Initiator+Alstra™ Peptide Synthesizer from Biotage (Uppsala, Sweden). Examples of suppliers who provide custom synthesized peptide strands include Biomatik (Wilmington, DE) and Thermo Fisher Scientific (Waltham, MA).

7.2.3. Ligand Attachment Site

The linker (120) may also include one or more ligand attachment sites (112) which may include a functional group located at a second, or distal end opposite the anchor site, of the linear or branched molecular chain. The functional groups of the one or more ligand attachment sites (112) may be capable of coupling to or binding to a ligand (114), and thereby detecting the presence of the one or more ligands (e.g., using SPR or LSPR). The functional groups of the ligands (114) may be capable of coupling to or binding to an analyte (116), and thereby detecting the presence of the analyte (e.g., using SPR or LSPR).

In one embodiment, the ligand attachment site (112) may be a molecule composed of any chemical functional group which binds to the ligand (114). In one embodiment, the ligand attachment site (112) may contain any chemical functional group which is capable of being attached to the previous molecule in the linker spacer (110) or linker chemical chain (108+110). In one embodiment there may be one or more functional groups at the ligand attachment site (112). In another embodiment, the ligand attachment site (112) may include three functional groups. In still another embodiment, two functional groups at the ligand attachment site (112) may be used to connect to the previous and subsequent molecules in the chain and the third functional group may be used to provide the attachment site (112) for the ligand (114). In one embodiment, the one or more chemical functional groups may include a carboxylic acid functional group. In another embodiment, the one or more chemical functional groups may include an amino functional group. In another embodiment, the attachment site (112) is an amino acid. If the ligand attachment site (112) is located on an amino acid, this amino acid is called an "attachment amino acid" (AAA). Examples of attachment amino acids (AAAs) that may be used in the linkers (120) of the present invention include: aspartic acid, glutamic acid, any natural or synthesized amino acid having an extra functional group, e.g. lysine with an extra amino group, and mixtures of any of the foregoing. In one embodiment, any molecule capable of binding with a ligand (114) such as biotin or nitrilotriacetic acid may be attached to the linker spacer (110) as a ligand attachment site (112).

Figure 2:
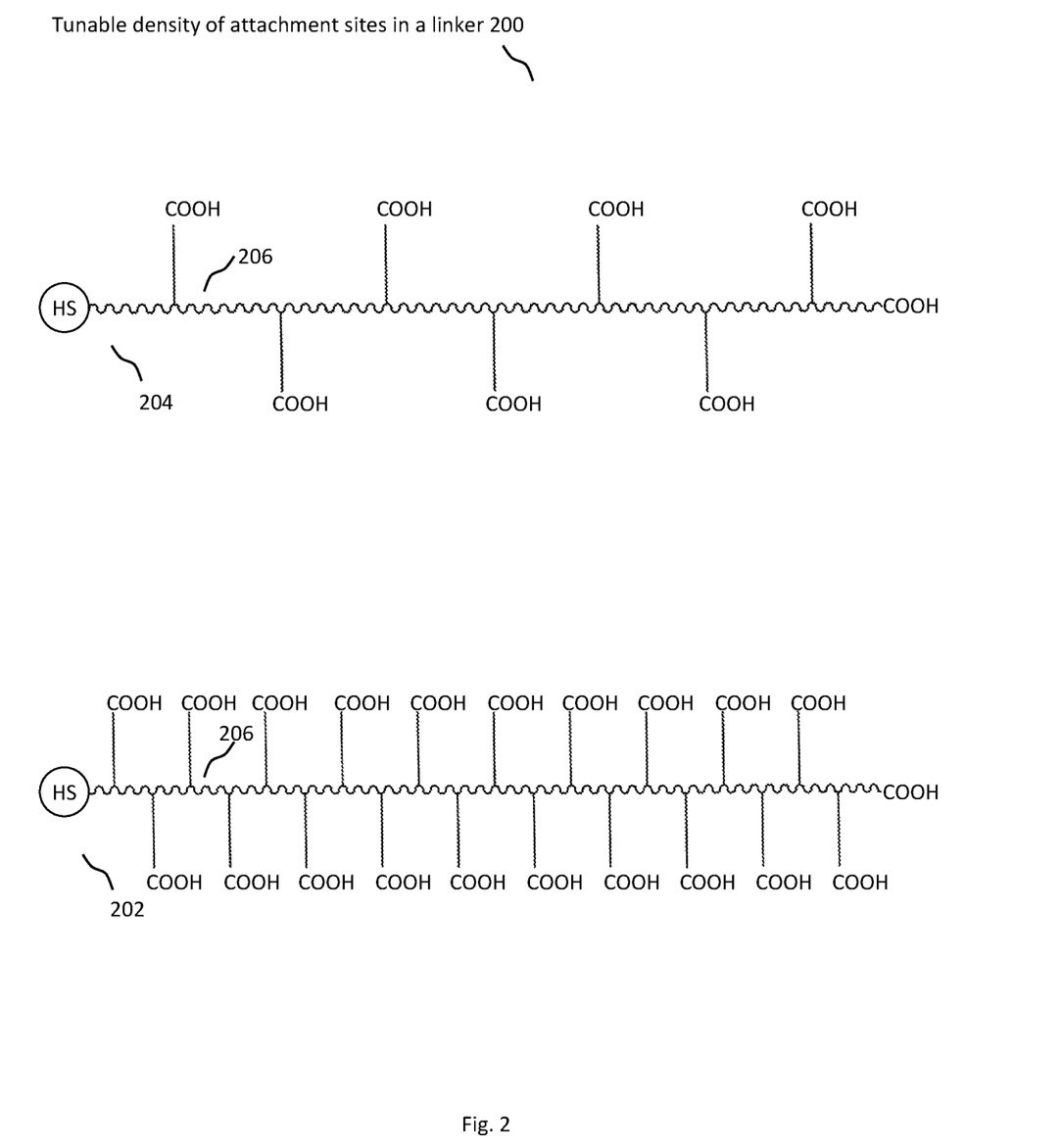
FIG. 2 illustrates exemplary SPR and LSPR tunable linkers with a decreased or increased density of attachment sites (e.g. —COOH) and conversely an increased or decreased number of spacer molecules, represented by wavy lines.

The characteristics of the spacer may be tuned to adjust the length of the linker (120) and/or the density of ligand attachment sites (112). For example, the length of the linker (120) and the density of ligand attachment sites (112) are tunable based on the steric considerations of the ligand (114) and the analyte of interest. In one embodiment, the attachment amino acid (AAA) may be aspartic acid which has one carbon spacer group. In another embodiment, the AAA may be glutamic acid which has two carbon spacers. In another embodiment the AAA may be lysine which has four carbon spacers. In another embodiment, the spacer may include a mix of AAAs. In a further embodiment, the number of AAAs and the particular sequence of AAAs may be chosen to tune the length of the linker (120) and the density of ligand attachment sites (112). FIG. 2 shows two exemplary linker structures where the bottom linker (202) has a higher density of attachment sites (112), represented here by —COOH groups. The top linker (204) has a lower density of attachment sites (112), represented by —COOH groups. In one example, a linker may be tunable by increasing or decreasing the number of —$CH_2$— spacer units (206) in an AAA which creates a larger or smaller distance between subsequent carboxylic acid (for example) ligand attachment site groups. For example, creating a linker (120) with more aspartic acid moieties may create a higher density of attachment sites (202), whereas creating a linker with more lysine moieties may create a lower density of attachment sites (204) simply because of the increased number of —$CH_2$— units in lysine relative to aspartic acid.

In one embodiment, the linker (120) may be selected or designed to increase the number of ligand (114) moieties coupled to the linker (120) which increases the number of binding sites available for capturing analyte (116) molecules. In another embodiment the linker (120) may be selected or designed (as described below) to avoid capturing non-target molecules in the sample thereby reducing non-specific binding (NSB) noise below the current state of the art.

Optimizing these parameters increases the number of analyte molecules able to bind to the ligand of interest which increases the signal beyond the current state of the art. Increasing the number of captured analyte (116) molecules results in an improvement in the SPR and LSPR signal. Increasing the signal and decreasing the noise improves the signal to noise ratio beyond current levels.

7.3. Examples

It will be appreciated that a wide variety of combinations of chemicals are possible within the scope of the invention to optimize the length, steric considerations and density of ligand attachment sites (112) in the linker (120). In one embodiment, the arrangement of chemicals in the linker (120) may be represented by the following schematic: HG-SG-AG, where "HG" is the "head group" (or anchor site, 108); "SG" is the "spacer group" in the linker (120) which includes any spacer molecules such as amino acids and PAG molecules such as PEG, POE, PPG, PBG, NPC and others; and "AG" is the ligand "attachment group" at the attachment site (112). In another embodiment, there may be multiple head groups (HG) or anchor sites (108) attached in succession (e.g. linear) or in a branched fashion in the linker (120). In another embodiment, there may be multiple spacer groups (SG) (110) attached in succession or in a branched fashion in the tunable linker (120). In another embodiment both the head group (108) and spacer groups (110) may be arranged in a combination of linear or branched arrangements. In another embodiment there may be multiple repeating units of SG-AG in the linker (120). These embodiments may be represented by the following schematic:

where the arrangement of HG, SG and AG may be in a linear or branched chain arrangement; and where there are always the appropriate number of bonds between chemical groups; and where X represents the number of head groups or anchor sites (108) arranged in succession or any other arrangement such as branched chain in the head group (108) of the linker (120); and where Y represents the number of spacer groups (110) arranged in succession or any other arrangement such as branched chain, in the linker (120); and where Z represents the number of [-AG] groups arranged in succession or any other arrangement such as branched chain in the linker (120); and where X comprises one or more head groups or anchor sites, and ranges from 1 to 10, or from 2 to 8, or from 2 to 6 or from 2 to 4 or from 1 to 3 and Y comprises the total number of spacer groups (SG) in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AG] groups, and ranges from 1 to 10, or from 2 to 8, or from 2 to 6, or from 2 to 4.

In one embodiment, the arrangement of the molecules in the linker (120) are arranged in the following order: HG-SG-AG-SG-AG-SG-AG-SG-AG. In this embodiment, Y is equal to 4 and Z is equal to 4 as an example shown for clarity. In one embodiment, the linker head or anchor site group (108), spacer group (110) and ligand attachment site (112) may all be composed of peptides. In this embodiment the linker is a tunable peptide linker.

7.3.1. Linker Head

In one embodiment the HG is an amino acid. In this embodiment, the HG is a head amino acid (HAA) composed of any amino acid whether natural or synthetic. The arrangement may be shown by the following example schematic: HAA-SG-AG-SG-AG-SG-AG-SG-AG or more generally by the following schematic:

$HAA_X[-SG]_Y[-AG]_Z$, where the arrangement of HAA, SG and AG may be in a linear or branched chain arrangement; and where there are always the appropriate number of bonds between chemical groups; and where X represents the number of HAA groups arranged in succession or any other arrangement such as branched chain in the head group (108) of the linker (120); and where Y represents the total number of spacer groups (110) which may be arranged in succession or any other arrangement such as branched chain or spaced throughout the linker (120); and where Z represents the total number of [-AG] groups arranged in succession or any other arrangement such as branched chain in the linker (120); and where X comprises one or more head groups or anchor sites, and ranges from 1 to 20, or from 2 to 8, or from 2 to 6 or from 2 to 4 and Y comprises the total number of spacer groups in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AG] groups, and ranges from 1 to 10, or from 2 to 8, or from 2 to 6, or from 2 to 4.

In another embodiment, the linker head or anchor site (108) is one or more cysteine (Cys) amino acid group, which can be represented by the following schematic:

$Cys_X[-SG]_Y[-AG]_Z$, where X represents the number of Cys groups in the linker head (108). In an embodiment the number of cysteine amino acids in the linker head (108) ranges from 1 to 20 or from 1 to 10 or from 1 to 5. In one embodiment, the number of cysteine amino acids at the linker head is 1. In another embodiment, the number of cysteine amino acids in the linker head is 2. In still another embodiment, the number of cysteine amino acids in the linker head is 3.

In an embodiment, the head of the linker is at least one methionine (Met) amino acid, which can be represented by the following schematic:

$Met_X[-SG]_Y[-AG]_Z$, where X is the number of Met groups in the linker head. In an embodiment the number of methionine amino acids in the linker head range from 1 to 20 or from 1 to 10 or from 1 to 5. In one embodiment, the number of methionine amino acids at the linker head is 1. In another embodiment, the number of methionine amino acids in the linker head is 2. In still another embodiment, the number of methionine amino acids in the linker head is 3.

7.3.2. Other Linker Heads

In an embodiment, the head of the linker is composed of at least one sulfur containing functional group "SR," which may be represented by the following schematic:

$SR_X[-SG]_Y[-AG]_Z$, where X represents the number of sulfur containing "SR" functional groups in the linker head. The sulfur containing functional groups, "SR," include any molecule either naturally occurring or synthetic which contains one or more sulfur elements in a linear or branched chain configuration such as disulfides, dithiocarbamates, dithiocarbamic acids, thiocarboxylic acids (thioacids), carbothioic acids or the anions of any of these molecules. In an embodiment the number of sulfur containing functional groups in the linker head ranges from 1 to 20 or from 1 to or from 1 to 5. In one embodiment, the number of sulfur containing functional groups at the linker head is 1. In another embodiment, the number of sulfur containing functional groups at the linker head is 2. In yet another embodiment, the number of sulfur containing functional groups at the linker head is 3.

In an embodiment, the head of the linker is composed of at least one diazonium (Da) functional group which may be represented by the following schematic:

$Da_X[-SG]_Y[-AG]_Z$, where X represents the number of diazonium functional groups in the linker head. In an embodiment the number of diazonium functional groups in the linker head ranges from 1 to 20 or from 1 to 10 or from 1 to 5. In one embodiment, the number of diazonium functional groups at the linker head is 1. In another embodiment, the number of diazonium functional groups at the linker head is 2. In yet another embodiment, the number of diazonium functional groups at the linker head is 3.

In an embodiment, the head of the linker is composed of at least one amine functional group, including primary, secondary, tertiary and quaternary amine groups, "NR," which may be represented by the following schematic:

$NR_X[-SG]_Y[-AG]_Z$, where X represents the number of primary, secondary, tertiary or quaternary amine "NR" functional groups in the linker head. In an embodiment the number of amine functional groups in the linker head ranges from 1 to 20 or from 1 to 10 or from 1 to 5. In one embodiment, the number of amine functional groups at the linker head is 1. In another embodiment, the number of amine functional groups at the linker head is 2. In yet another embodiment, the number of amine functional groups at the linker head is 3.

The thiol (—SH) functional group in cysteine, the sulfide (R—S—R') functional group in methionine, and the diazonium functional group (R—$N_2^+$) may bind spontaneously to the gold layer or nanoparticle. Increasing the number of thiol functional groups by increasing the number, X, of cysteines in the tunable linker head causes a stronger linker attachment, or anchor, to the gold. Increasing the number of sulfide functional groups by increasing the number, X, of methionines in the tunable linker head causes a stronger linker attachment to the gold. Increasing the number of other sulfur containing functional groups in the tunable linker head causes a stronger linker attachment to the gold. Increasing the number of diazonium functional groups in the tunable linker head causes a stronger linker attachment to the gold. Increasing the number of amine functional groups in the tunable linker head causes a stronger linker attachment to the gold. Increasing the number of carbon containing functional groups in the tunable linker head causes a stronger linker attachment to the gold. In an embodiment of the invention, the stability of the peptide linker SAM attached to the metal surface is therefore tunable by selecting the number of head functional groups which bind to the metal (e.g. gold) layer.

7.3.3. Linker Spacer

In one embodiment both the HG and SG are amino acids. In another embodiment, the HG is a head amino acid (HAA) composed of any amino acid whether natural or synthetic and the SG is a spacer amino acid (SAA) composed of any amino acid whether natural or synthetic. The arrangement may be shown by the the following exemplary schematic: HAA-SAA-AG-SAA-AG-SAA-AG-SAA-AG or more generally by the following schematic:

$$HAA_X[-SAA]_Y[-AG]_Z,$$

where the arrangement of HAA, SAA and AG may be in a linear or branched chain arrangement, where there are always the appropriate number of bonds between chemical groups, where X represents the number of HAA groups arranged in succession or any other arrangement such as a branched chain in the head region of the linker, where Y represents the total number of [-SAA] groups arranged in succession or any other arrangement such as a branched chain in the spacer region of the linker, where Z represents the total number of [-AG] groups arranged in succession or any other arrangement such as branched chain in the linker (120), and where X comprises one or more head amino acid (HAA) or anchor site groups, and ranges from 1 to 20, or from 2 to 8, or from 2 to 6 or from 2 to 4 and Y comprises the total number of spacer amino acid (SAA) groups in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AG] groups, and ranges from ranges from 1 to or from 2 to 8, or from 2 to 6, or from 2 to 4.

In another embodiment, the linker spacer group includes one or more glycine amino acids, which can be represented by the following schematic:

$$HAA_X[-Gly]_Y[-AG]_Z,$$

where Y represents the total number of Gly groups in the linker and where X and Z are defined immediately above. In one embodiment the number of glycine amino acids in the linker ranges from 1 to 20. In one embodiment, the number of glycine amino acids in the linker is 1.

7.3.4. Other Linker Spacer Groups

In another embodiment, the HG is a head amino acid (HAA) composed of any amino acid whether natural or synthetic and the SG is a "polyalkylene glycol" (PAG) such as PEG, POE, PPG, PBG, NPC or others, and various combinations of the forgoing. The arrangement may be shown by the following exemplary schematic: HAA-PAG-AG-PAG-AG-PAG-AG-PAG-AG or more generally by the following schematic:

$$HAA_X[-PAG]_Y[-AG]_Z,$$

where the arrangement of HAA, PAG and AG may be in a linear or branched chain arrangement, where there are always the appropriate number of bonds between chemical groups, where X represents the number of HAA groups arranged in succession or any other arrangement such as a branched chain in the head or anchor site region of the linker, where Y represents the total number of [-PAG] groups arranged in succession or any other arrangement such as a branched chain in the linker, where Z represents the total number of [-AG] groups arranged in succession or any other arrangement such as branched chain in the linker (120), and where X comprises one or more head amino acid (HAA) groups, and ranges from 1 to 20, or from 2 to 8, or from 2 to 6 or from 2 to 4; and Y comprises the total number of [-PAG] groups in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AG] groups, and ranges from ranges from 1 to or from 2 to 8, or from 2 to 6, or from 2 to 4.

In one embodiment, the number of PAG groups, Y, in the spacer ranges from 1 to about 20. In another embodiment, the number of PAG groups, Y, in the spacer ranges from about 2 to about 15. In another embodiment, the number of PAG groups, Y, in the spacer ranges from about 2 to about 10. In another embodiment, the number of PAG groups, Y, in the spacer is about 8. In one embodiment, the PAG units comprise PEG units and the number of PEG groups, Y, in the spacer ranges from 1 to about 20. In another embodiment, the number of PEG groups, Y, in the spacer ranges from about 2 to about 15. In another embodiment, the number of PEG groups, Y, in the spacer ranges from about 2 to about 10. In another embodiment, the number of PEG groups, Y, in the spacer is about 8. In one embodiment, PAG is NPC. In one embodiment, the number of NPC groups, Y, in the spacer ranges from 1 to about 20. In another embodiment, the number of NPC groups, Y, in the spacer ranges from about 2 to about 15. In another embodiment, the number of NPC groups, Y, in the spacer ranges from about 2 to about 10. In another embodiment, the number of NPC groups, Y, in the spacer is about 8. In one embodiment, the total number of PAG in the linker is 8. In one embodiment PAG is PEG. In one embodiment, the total number of PEG in the linker is 8. In another embodiment, PAG is NPC. In one embodiment, the total number of NPC in the linker is 8. In one embodiment, the spacer may include hydrophobic groups. The the number of hydrophobic groups, Y, in the spacer ranges from 1 to about 20. In another embodiment, the number of hydrophobic groups, Y, in the spacer ranges from about 2 to about 15. In another embodiment, the number of hydrophobic groups, Y, in the spacer ranges from about 2 to about 10. In another embodiment, the number of hydrophobic groups, Y, in the spacer is about 8.

In an embodiment of the present invention, the length of the linker is tunable. In one embodiment the length of the linker is tunable by varying the number and type of spacer groups.

7.3.5. Ligand Attachment Site

In one embodiment, the HG, SG and AG are amino acids. In another embodiment, the HG is a head amino acid (HAA) composed of any amino acid whether natural or synthetic, the SG is a spacer amino acid (SAA) composed of any amino acid whether natural or synthetic and the AG is an attachment amino acid (AAA) composed of any amino acid whether natural or synthetic. An exemplary arrangement may be shown by the following schematic: HAA-SAA-AAA-SAA-AAA-SAA-AAA-SAA-AAA or more generally by the following schematic:

$$HAA_X\text{-}[SAA]_Y\text{-}[AAA]_Z,$$

where the arrangement of HAA, SAA and AAA may be in a linear or branched chain arrangement, where there are always the appropriate number of bonds between chemical groups, where X represents the number of HAA groups arranged in succession or any other arrangement such as a branched chain in the head region of the linker, where Y represents the total number of spacer groups arranged in succession or any other arrangement such as a branched chain in the linker, where Z represents the total number of [-AAA] groups arranged in succession or any other arrangement such as branched chain in the linker (120), and where X comprises one or more head amino acid (HAA) groups, and ranges from 1 to 20, or from 2 to 8, or from 2 to 6 or from 2 to 4 and Y comprises the total number of spacer amino acid (SAA) groups in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AAA] groups, and ranges from 1 to 10, or from 2 to 8, or from 2 to 6, or from 2 to 4.

Examples of amino acids that may be used in the tunable linker attachment site include: aspartic acid, glutamic acid, any natural or custom synthesized amino acid having an extra functional group, e.g. lysine having an extra amino group, and mixtures of any of the foregoing. The arrangement may be shown by the following schematics:

$$HAA_X\text{-}[SAA]_Y\text{-}[Asp]_Z, HAA_X\text{-}[SAA]_Y\text{-}[Glu]_Z,$$
$$HAA_X\text{-}[SAA]_Y\text{-}[Lys]_Z,$$

where Z represents the total number of [-Asp], [-Glu] or [-Lys] groups in the linker attachment site. In an embodiment the number of aspartic acids in the linker ranges from 1 to 20 or from 1 to 10 or from 1 to 5. In another embodiment, the number of aspartic acids at the linker is 1. In an embodiment the number of glutamic acids in the linker ranges from 1 to 20 or from 1 to 10 or from 1 to 5. In another embodiment, the number of glutamic acids at the linker is 1. In an embodiment the number of lysines in the linker ranges from 1 to 20 or from 1 to 10 or from 1 to 5. In another embodiment, the number of lysines at the linker is 1. In yet another embodiment, the amino acid at the attachment site, the attachment amino acid (AAA) is glutamic acid.

In one embodiment, selecting Glu as the AAA makes the linker very hydrophilic. The current state of the art uses hydrophobic chemical chains to bind to ligands. Hydrophobic chemical chains undergo non-specific binding (NSB) with errant molecules in the analyte solution which causes instrument noise. In one embodiment, the linker may be selected or designed to avoid capturing non-target molecules. In an embodiment of the invention, the amount of NSB due to the linker is tunable. In one embodiment the NSB of the linker is tunable by varying the type and number of AAAs.

In some embodiments, the one or more attachment amino acid (AAA) sites located in the linker may contain any chemical functional group which may be used to couple with the ligand. In one embodiment of the invention, carboxylic acid functional groups (e.g. —COOH) may be used as attachment sites. Although it will be appreciated that a wide variety of chemical reactions are possible within the scope of the invention, the carboxylic acid functional groups may undergo dehydration, as one example, with functional groups on the ligands to form a bond. In another embodiment the attachment site may be an amine functional group. In another embodiment, the attachment site may be an amino acid. In another embodiment, the attachment site may be an aspartic acid. In another embodiment, the attachment site may be a glutamic acid. In another embodiment, the attachment site may be a lysine. In another embodiment, the attachment site may be a mix of amino acids. In another embodiment, the attachment site may be a natural amino acid. In another embodiment, the attachment site may be a synthetic amino acid. In another embodiment, the attachment site may be a mix of natural and synthetic amino acids. In another embodiment, the attachment site may be gold atoms. In another embodiment, the attachment site may be a biotin molecule. In another embodiment, the attachment site may be a streptavidin molecule. In another embodiment, the attachment site may be a nitrilotriacetic acid (NTA) molecule. In another embodiment, the attachment site may be a Protein A molecule. In another embodiment, the attachment site may be a lipophilic molecule. In another embodiment, the attachment site may be a hydrophobic molecule. In another embodiment, the attachment site may be a hydrophilic molecule. In another embodiment the attachment site may be any functional group which may be chemically converted to a carboxylic acid functional group. In another embodiment the attachment site may be any functional group which may be chemically converted to an amine functional group. In another embodiment, the attachment site may come from any natural or synthetic amino acid with a functional group which may bind to a ligand on its own or may be chemically modified to bind to a ligand.

Figure 3:
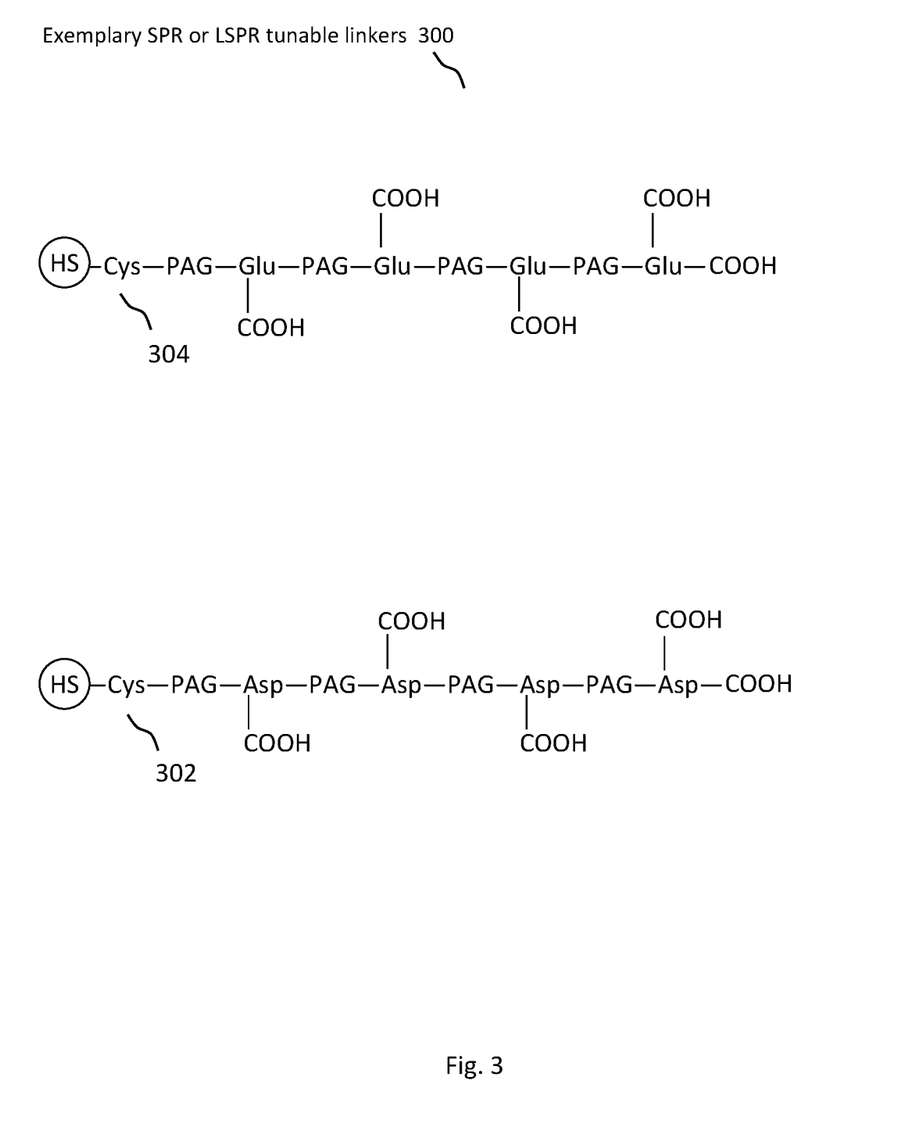
FIG. 3 illustrates exemplary SPR or LSPR tunable linkers where the anchor site or linker "head" may include a cysteine (Cys), the spacer molecule may include a polyalkylene glycold (PAG) and the attachment sites may include one or more amino acids, wherein the one or more amino acids may include glutamic acids or alternatively aspartic acids with an example of attachment sites being a —COOH functional group. A mix of glutamic acids and aspartic acids in one linker is not shown but may easily be envisaged by one of ordinary skill in the art.

The number of attachment sites (e.g. carboxylic acids) and spacer group (e.g. NPC) units may be selected to achieve a desired density of attachment sites on the linker as shown in FIG. 3. For example, larger ligands may require lower attachment site density (304), while smaller ligands may support a larger attachment site density (302). Similarly, larger analytes may require lower ligand density, while smaller analytes may support a larger ligand density.

In some cases, fewer PAG or spacer groups, represented by wavy lines (206) in FIG. 2, and more amino acids (with —COOH functional groups for example) may be used to increase the density of the attachment sites and therefore increase the density of ligands able to bind to the linker (202). In another embodiment, more PAG groups (206) can be added with fewer amino acids in the linker which creates a larger distance between attachment sites and thereby decreases the density of ligands able to bind to the linker (204). In an embodiment of the invention, the density of the linker attachment sites is tunable.

Increasing the number of immobilized ligands (e.g. proteins) bound to the linker increases the number of analyte molecules captured which directly increases SPR and LSPR signal strength. However one cannot solely increase the number of the attachment (e.g. —COOH) functional groups on the tunable linker with the expectation of a linear increase in analyte capture. The size and shape of the immobilized ligand (e.g. protein) and the analyte must also be considered. The linker-ligand may be tuned to increase analyte capture given steric constraints of the ligands and analytes. In some embodiments where the ligand (e.g. protein) is large, a higher density of attachment (e.g. —COOH) sites might sterically impede an increased concentration of immobilized proteins. Therefore, in one embodiment, the novel linker may be tuned with an increased number of PAG units and a decreased number of amino acid sites. This embodiment would increase the length of the linker and decrease the density (204) of attachment sites. In some embodiments such as this example, a decreased number of attachment (e.g. —COOH) sites is preferred.

In other embodiments, where the ligand (e.g. protein) is not as large, a higher density of attachment sites might not have the steric considerations discussed above and in fact may be desirable to bind a higher concentration of ligands (e.g. proteins). Therefore, in one embodiment, the novel linker may be tuned with a decreased number of PAG units and an increased number of amino acid sites (202). This embodiment would decrease the length of the spacer between attachment sites and therefore increase the density (202) of attachment (e.g. —COOH) sites. In some embodiments such as this example, an increased number of attachment (e.g. —COOH) sites is preferred.

In one embodiment, the linker may be a branched PAG without requiring the use of amino acids. The branched PAG may include branches terminated with attachment sites for ligands, such as carboxylic acid sites.

Examples of tunable linkers include but are not limited to:

| | | |
|---|---|---|
| $Cys_X[-Gly]_Y[-Asp]_Z$, | $Cys_X[-Gly]_Y[-Glu]_Z$, | $Cys_X[-Gly]_Y[-Lys]_Z$, |
| $Cys_X[-Phe]_Y[-Asp]_Z$, | $Cys_X[-Phe]_Y[-Glu]_Z$, | $Cys_X[-Phe]_Y[-Lys]_Z$, |
| $Cys_X[-Trp]_Y[-Asp]_Z$, | $Cys_X[-Trp]_Y[-Glu]_Z$, | $Cys_X[-Trp]_Y[-Lys]_Z$, |
| $Cys_X[-PAG]_Y[-Asp]_Z$, | $Cys_X[-PAG]_Y[-Glu]_Z$, | $Cys_X[-PAG]_Y[-Lys]_Z$, |
| $Cys_X[-NPC]_Y[-Asp]_Z$, | $Cys_X[-NPC]_Y[-Glu]_Z$, | $Cys_X[-NPC]_Y[-Lys]_Z$, |
| $Met_X[-Gly]_Y[-Asp]_Z$, | $Met_X[-Gly]_Y[-Glu]_Z$, | $Met_X[-Gly]_Y[-Lys]_Z$, |
| $Met_X[-Phe]_Y[-Asp]_Z$, | $Met_X[-Phe]_Y[-Glu]_Z$, | $Met_X[-Phe]_Y[-Lys]_Z$, |
| $Met_X[-Trp]_Y[-Asp]_Z$, | $Met_X[-Trp]_Y[-Glu]_Z$, | $Met_X[-Trp]_Y[-Lys]_Z$, |
| $Met_X[-PAG]_Y[-Asp]_Z$, | $Met_X[-PAG]_Y[-Glu]_Z$, | $Met_X[-PAG]_Y[-Lys]_Z$, |
| $Met_X[-NPC]_Y[-Asp]_Z$, | $Met_X[-NPC]_Y[-Glu]_Z$, | $Met_X[-NPC]_Y[-Lys]_Z$, |
| $Da_X[-Gly]_Y[-Asp]_Z$, | $Da_X[-Gly]_Y[-Glu]_Z$, | $Da_X[-Gly]_Y[-Lys]_Z$, |
| $Da_X[-Phe]_Y[-Asp]_Z$, | $Da_X[-Phe]_Y[-Glu]_Z$, | $Da_X[-Phe]_Y[-Lys]_Z$, |
| $Da_X[-Trp]_Y[-Asp]_Z$, | $Da_X[-Trp]_Y[-Glu]_Z$, | $Da_X[-Trp]_Y[-Lys]_Z$, |
| $Da_X[-PAG]_Y[-Asp]_Z$, | $Da_X[-PAG]_Y[-Glu]_Z$, | $Da_X[-PAG]_Y[-Lys]_Z$, |
| $Da_X[-NPC]_Y[-Asp]_Z$, | $Da_X[-NPC]_Y[-Glu]_Z$, | $Da_X[-NPC]_Y[-Lys]_Z$, | where:

X comprises one or more head groups or anchoring sites, and ranges from 1 to 20, or from 2 to 8, or from 2 to 6 or from 2 to 4 and Y comprises the total number of spacer groups (SG) in the spacer, and ranges from 1 to 50, or from 1 to 40, or from 1 to 30, or from 1 to 20, or from 1 to 10, or from 1 to 5, or from 4 to 8, or from 6 to 8; and Z comprises the total number of [-AG] groups, and ranges from ranges from 1 to or from 2 to 8, or from 2 to 6, or from 2 to 4.

FIG. 3 shows two exemplary linkers of the form: $Cys_X[-PAG]_Y[-Asp]_Z$ (302) and $Cys_X[-PAG]_Y[-Glu]_Z$ (304), where X is 1, where the number of PAG units, Y, can vary as described above and Z, the total number of [-Asp] and [-Glu] units is 4. In these exemplary linkers, the length of the linker is tunable by increasing (304) the number of —CH$_2$— spacer units by selecting Glu as the AAA which creates a larger distance between subsequent carboxylic acid (for example). Conversely, the length of the linker is tunable by decreasing (302) the number of —CH$_2$— spacer units by selecting Asp as the AAA which creates a smaller distance between subsequent carboxylic acid (for example). Therefore the length of the linker and the density of attachment sites is tunable based on the choice of attachment amino acids.

7.4. Samples

The methods are useful for various sample types, such as proteins, antibodies, carbohydrates, nucleic acids, aptamers, small molecules, drugs and nanoparticles.

8. MATERIALS AND METHODS

For SPR sensor preparation, glass slides coated with gold may be purchased from GE Healthcare, Uppsala, Sweden. The thickness of the evaporated gold film may be 100 nm as appropriate for SPR measurements. Gold coated nanoparticles may be prepared using the following example methods.

8.1. Method 1: Gold Nanoparticles Deposited onto Polyelectrolyte Functionalized Glass Surface We followed the method of Omura et al. (2009) to deposit a polyelectrolyte (e.g. PAH (MilliporeSigma, St. Louis, MO, USA), average Mw<70,000)) onto the glass surface. The transparent glass surfaces may be immersed into a 2 mg/mL solution of polyelectrolyte (e.g. PAH) for 20 min at room temperature. The coated glass may then be rinsed with pure water before depositing the gold nanoparticles (AuNPs). The polyelectrolyte (e.g. PAH) binds electrostatically to the glass changing the external charge from negative to positive. This allows the electrostatic binding of negatively charged AuNPs. The polyelectrolyte (e.g. PAH) coated transparent glass surfaces may be immersed in a citrate capped AuNP suspension of 100 ppm at pH=5.5. Electrostatic interaction causes the negatively charged AuNPs to be immobilized to the positively charged polyelectrolyte (e.g. PAH) layer on the glass slide. Gold nanoparticles (100 nm) may be purchased from NanoComposix (San Diego, CA, USA).

8.2. Method 2: Polyelectrolyte Stabilized Gold Nanoparticles Deposited onto Glass Surface We followed a method similar to that of Fuller and Koper (2018) for the preparation of polyelectrolyte stabilized gold nanoparticles. We purchased 100 nm diameter citrate capped AuNPs at a concentration of $8.4 \times 10^{13}$ particles/mL from NanoComposix (San Diego, CA, USA). We then mixed 2 mL of this particle solution with 3 mL of poly(allylamine hydrochloride) (PAH) (MilliporeSigma, St. Louis, MO, USA), average MW<70,000) solution at a concentration of 5 mg/mL in 1 mM NaCl salt solution to prevent aggregation. The AuNP/PAH mixtures may be stirred overnight before centrifuging at 14500 rpm for 40 min. The supernatant may be removed and the pellet may be resuspended in 1 mL of 1 mM NaCl. This washing may be repeated three times to remove any excess PAH. The pH of the nanoparticle solution may be adjusted to pH=6 using 1 M HCl and measured using the Mettler Toledo pH Meter. The attachment of the PAH onto the AuNPs and the subsequent stability of the AuNPs may be determined through the use of UV-vis spectroscopy (Cary 50) in 1 mM NaCl with the wavelength range of 400-800 nm.

Next the polyelectrolyte (e.g. PAH) stabilized AuNPs may be deposited on a glass slide. First, the glass slide may be cleaned using ethanol, then acetone and followed by deionized water in an ultrasonic bath. Finally the glass slide may be blown dry with $N_2$ gas. The cleaned glass slide may be coated with the PAH stabilized AuNPs by dipping the glass surface into a 1.0 mM PAH solution in 0.1 M NaCl in $H_2O$. SAM deposition on the PAH stabilized gold nanoparticles may be performed using the following example method.

8.3. Solid-Phase Peptide Synthesis

8.3.1. SAM Deposition on Gold Nanoparticle Coated Silica Slides

The tunable peptide linker may be synthesized in the laboratory using standard fmoc chemistry or commercially using the Applied Biosystems 433A peptide synthesizer. As an example of the synthesis of SPR or LSPR sensors with one, two, three and four Glu peptide units, the following methods may be employed. Unless otherwise mentioned, chemicals may be purchased from Sigma-Aldrich (MilliporeSigma, St. Louis, MO, USA).
1. Four gold sensors with a SAM of 11-Amino-1-undecanethiol hydrochloride may be rinsed with Milli-Q water and then with reagent alcohol (RA) and dried with compressed air.
2. The coupling mixture may be prepared by combining 344 mg HATU, 122 mg hydrated HOBT and 12.9 mg fmoc-Glu-OH and then dissolving this mixture in 2530 µL DMF. Subsequently, 470 µL DIPEA may be added and the mixture may be shaken for 15 min.
3. Next, the sensors may be transferred to a reactor bottle containing the coupling cocktail and these may be shaken for 100 min at 400 RPM.
4. Next, the sensors may be rinsed with DMF (6×1 mL), followed by RA and then dried with compressed air.
5. In the next step, the fmoc deprotection step may be completed using the standard protocol of combining the sensors with 3 mL of a 20% piperidine/DMF solution for 5 min. After the first 5 min, the sensors may be transferred to a second bottle with the same conditions for 5 minutes. Finally, 20 uL piperidine/DMF may be dropped on each sensor for 3 min.
6. The sensors may then be washed with 5×1 mL DMF, rinsed with RA, and dried with compressed air. Three of the sensors may be returned to a bottle containing the coupling mixture. The one remaining sensor may be reserved for tert-butyl oxide deprotection (see below).
7. The coupling/fmoc deprotection steps may be repeated for the rest of sensors, where each time one sensor may be reserved for tert-butyl oxide deprotection.
8. Thus, starting with four sensors, four functionalized sensors may be generated in which the first sensor may have one Glu unit, the second sensor two, the third sensor three and the fourth sensor may have four Glu units.

8.3.2. Tert-Butyl Oxide Deprotection

All the sensors may be washed with DMF and RA. Next they may be dried with compressed air. The sensors may then be transferred to a bottle containing 3 mL of 95% Trifluoroacetic acid in water for 25 min for tBuO deprotection, then washed with RA, and finally dried with compressed air.

8.3.3. Peptide Sensor Succinylation

The deprotected sensors may be transferred to a bottle containing 3 mL of 1M succinic anhydride (305 mg) in 2.8 mL dry DMSO and 166 µL of 0.4 M Triethylamine and shaken overnight.

8.3.4. Peptide Sensor Storage

After being shaken overnight, the sensors may then be washed with DMSO (5×1 mL), RA and Milli-Q water and stored in 1×PBS buffer at a pH=7.4 for one day prior to testing.

8.4. SAM Deposition on Gold Layer Coated Silica Slides

We used a method similar to that of Anna Bergstrom (2009) to deposit a SAM of the tunable peptide linker on glass slides coated with gold and with immobilized gold nanoparticles. Prior to monolayer assembly, all gold surfaces may be cleaned in a 5:1:1 mixture of Milli-Q water, 30% hydrogen peroxide and 25% ammonia (TL-1 wash) at 85° C. for 10 minutes, to remove any organic contamination. Tweezers used to handle the surfaces may be washed according to the same procedure. After washing, surfaces may be rinsed thoroughly in Milli-Q water and examined using ellipsometry to verify cleanliness. Surfaces may be then rinsed with ethanol and then incubated for 24 hours in a solution containing 75% ethanol, 25% water and 50 µM to 10 mM of the linker. Shortly before analysis, any unattached linker may be removed by rinsing the sensor surface with ethanol followed by deionized water for 2-3 times. Finally the glass slide may be blown dry with compressed air.

8.5. SAM Characterization

The SPR or LSPR sensors are incubated in 1×PBS buffer (pH 7.5) Thermo Fisher Scientific (Waltham, MA) for 24 h. The surface may be characterized using either Surface-Enhanced Raman Spectroscopy (SERS) technique or FT-IR spectroscopy. Additionally, the sensor quality may be characterized using Nicoya's Open SPR device (R4) by comparing the performance of newly developed sensors to that of commercially available sensors.

9. REFERENCES

Fuller, Melanie, and Ingo Koper. "Polyelectrolyte-Coated Gold Nanoparticles: The Effect of Salt and Polyelectrolyte Concentration on Colloidal Stability." Polymers vol. 10, 12 1336. 3 Dec. 2018, doi:10.3390/polym10121336.

Bergström, Anna. "*SPR Sensor Surfaces based on Self-Assembled Monolayers.*" 2009. Linkoping University, Master's thesis. https://www.diva-portal.org/snnash/get/diva2:159757/FULLTEXT02.pdf.

Omura et al. "Comparison of Plasmonic Sensing between Polymer- and Silica-coated Gold Nanorods." ANALYTICAL SCIENCES February 2009, VOL. 25, pg 255.

We claim:
1. A localized surface plasmon resonance (LSPR) sensor for detecting an analyte of interest, the sensor comprising:

a surface comprising a solid support functionalized with a polyelectrolyte and metal nanoparticles disposed on the polyelectrolyte, the metal nanoparticles comprising a plurality of linkers disposed thereon forming a layer on the metal nanoparticles, each linker comprising an anchor for coupling the linker to the metal nanoparticles, one or more spacers connected to the anchor, and a plurality of attachment groups connected to the spacer, each attachment group comprising at least one ligand attachment site configured to bind to a ligand, the anchor connected to the spacer with a peptide bond, wherein the sensor is configured to detect an analyte of interest based on binding of the ligand to the analyte of interest.

2. The LSPR sensor of claim 1, wherein the plurality of attachment groups are positioned terminally and/or between the one or more spacers.

3. The LSPR sensor of claim 1, wherein an attachment group of the plurality of attachment groups is positioned terminally.

4. The LSPR sensor of claim 1, wherein an attachment group of the plurality of attachment groups is positioned between the one or more spacers.

5. The LSPR sensor of claim 1, wherein the at least one ligand attachment site comprises a carboxyl group or amine group.

6. The LSPR sensor of claim 1, wherein an attachment group of the plurality of attachment groups comprises an amino acid.

7. The LSPR sensor of claim 1, wherein an attachment group of the plurality of attachment groups is an amino acid selected from the group consisting of:

aspartic acid, glutamic acid, or lysine.

8. The LSPR sensor of claim 1, wherein each of the one or more spacers are the same.

9. The LSPR sensor of claim 1, wherein each of the one or more spacers are different.

10. The LSPR sensor of claim 1, wherein the one or more spacers is one or more polyalkylene glycol (PAG) molecules.

11. The LSPR sensor of claim 10, wherein each of the one or more PAG molecules individually comprises from about 2 to about 20 monomers.

12. The LSPR sensor of claim 10, wherein each of the one or more PAG molecules is individually selected from the group consisting of: polyethylene glycol (PEG), polyoxyethylene (POE), polypropylene glycol (PPG), polybutylene glycol (PBG), amine-PEG-carboxyl (NPC), and any combination thereof.

13. The LSPR sensor of claim 1, wherein the anchor comprises a thiol group.

14. The LSPR sensor of claim 1, wherein the anchor comprises a sulfur containing amino acid.

15. The LSPR sensor of claim 1, wherein the metal nanoparticles comprise gold.

16. The LSPR sensor of claim 1, wherein the anchor comprises a thiol group, the one or more spacers is one or more polyalkylene glycol (PAG) molecules, and the at least one ligand attachment site comprises a carboxyl group or an amine group.

17. The LSPR sensor of claim 1, wherein the anchor comprises a sulfur containing amino acid, the one or more spacers is one or more polyethylene glycol (PEG) molecules, and an attachment group of the plurality of attachment groups comprises a glutamic acid amino acid.

18. The LSPR sensor of claim 17, wherein the glutamic acid amino acid is positioned terminally.

19. The LSPR sensor of claim 17, wherein the glutamic acid amino acid is positioned between the one or more spacers.

* * * * *

UNITED STATES PATENT AND TRADEMARK OFFICE
CERTIFICATE OF CORRECTION

| | |
|---|---|
| PATENT NO. | : 12,326,403 B2 |
| APPLICATION NO. | : 18/463700 |
| DATED | : June 10, 2025 |
| INVENTOR(S) | : Chanel Leong et al. |

Page 1 of 1

It is certified that error appears in the above-identified patent and that said Letters Patent is hereby corrected as shown below:

In the Specification

Column 5, Line 37, "fnnoc" should be --fmoc--.

Column 14, Line 26, "1 to or" should be --1 to 10 or--.

Column 15, Line 51, "1 to or" should be --1 to 10, or--.

Column 16, Line 29, "1 to or" should be --1 to 10, or--.

Column 19, Line 59, "1 to or" should be --1 to 10, or--.

Column 22, Line 59, "snnash" should be --smash--.

Signed and Sealed this
Ninth Day of September, 2025

Coke Morgan Stewart
*Acting Director of the United States Patent and Trademark Office*